(12) United States Patent
Choi et al.

(10) Patent No.: US 9,674,034 B2
(45) Date of Patent: Jun. 6, 2017

(54) METHOD AND SYSTEM FOR REPAIRING COMMUNICATION DISRUPTION USING GATEWAY

(71) Applicant: HYUNDAI MOTOR COMPANY, Seoul (KR)

(72) Inventors: Sung Ho Choi, Suwon-si (KR); Jin Gu Kwon, Seoul (KR); Myoung Soo Park, Bucheon-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 156 days.

(21) Appl. No.: 14/644,165

(22) Filed: Mar. 10, 2015

(65) Prior Publication Data

US 2016/0164718 A1 Jun. 9, 2016

(30) Foreign Application Priority Data

Dec. 8, 2014 (KR) .................. 10-2014-0175024

(51) Int. Cl.
*H04L 12/24* (2006.01)
*H04L 12/403* (2006.01)
(Continued)

(52) U.S. Cl.
CPC ........ *H04L 41/0672* (2013.01); *H04L 12/403* (2013.01); *H04L 41/0677* (2013.01);
(Continued)

(58) Field of Classification Search
None
See application file for complete search history.

(56) References Cited

U.S. PATENT DOCUMENTS

| 7,787,479 B2* | 8/2010 | Matsuo | ............... H04L 12/4135 370/401 |
| 2008/0219274 A1* | 9/2008 | Kato | ................... H04L 12/4625 370/401 |

(Continued)

FOREIGN PATENT DOCUMENTS

| JP | 2005-102336 A | 4/2005 |
| JP | 2005-159769 A | 6/2005 |

(Continued)

OTHER PUBLICATIONS

Korean Office Action issued in corresponding Korean Patent Application No. 10-2014-0175024, mailed on Aug. 31, 2015.

*Primary Examiner* — Brian Roberts
(74) *Attorney, Agent, or Firm* — McDermott Will & Emery LLP

(57) ABSTRACT

A method of repairing communication disruption using a gateway, and an apparatus and a system therefor are disclosed. A method of repairing communication disruption in a gateway includes detecting whether failure in a communication line occurs by monitoring a change in voltage of the communication line, successively transmitting communication line disconnection request signals to first to Nth smart joint blocks when the occurrence of the communication line failure is detected, and determining whether the communication line failure is repaired after transmitting the communication line disconnection request signals. The communication line failure may be repaired by identifying a smart joint block causing the failure according to a result of the determination. Accordingly, the present invention has an advantage of providing more stable in-vehicle communication by automatically repairing communication line failure.

22 Claims, 4 Drawing Sheets

(51) Int. Cl.
*H04L 12/26* (2006.01)
*H04L 12/40* (2006.01)
(52) U.S. Cl.
CPC ...... *H04L 43/0811* (2013.01); *H04L 41/0686* (2013.01); *H04L 2012/40215* (2013.01); *H04L 2012/40273* (2013.01)

(56) References Cited

U.S. PATENT DOCUMENTS

| | | | | |
|---|---|---|---|---|
| 2009/0183033 | A1* | 7/2009 | Ando | H04L 43/0823 |
| | | | | 714/43 |
| 2011/0231053 | A1* | 9/2011 | Kuramochi | H04L 12/40026 |
| | | | | 701/31.4 |
| 2013/0318263 | A1* | 11/2013 | Heiling | H04L 12/40039 |
| | | | | 710/105 |
| 2015/0105973 | A1* | 4/2015 | Cicala | G01R 31/007 |
| | | | | 701/34.4 |

FOREIGN PATENT DOCUMENTS

| | | |
|---|---|---|
| JP | 2009-130772 A | 6/2009 |
| JP | 2009-130774 A | 6/2009 |
| JP | 2010-093676 A | 4/2010 |
| KR | 10-0976710 B1 | 8/2010 |

\* cited by examiner

METHOD AND SYSTEM FOR REPAIRING COMMUNICATION DISRUPTION USING GATEWAY

CLAIM OF PRIORITY

This application claims the benefit of Korean Patent Application No. 10-2014-0175024, filed on Dec. 8, 2014, which is hereby incorporated by reference as if fully set forth herein.

BACKGROUND OF THE INVENTION

Field of the Invention

The present invention relates to communication in a vehicle, and more particularly, to a method and system for repairing communication disruption using a gateway, capable of automatically repairing communication disruption using the gateway in a communication system in a vehicle to which high-speed controller area network (CAN) communication is applied.

Discussion of the Related Art

With development of automobile technology, recently released vehicles provide more diverse and complicated measuring and sensing functions. The sensing function is controlled by an electronic control unit (ECU) of the vehicle.

In particular, more electronic devices are installed in the vehicle due to a continual demand for high quality of the vehicle and safety and convenience of a consumer, and thus a communication network for exchanging and sharing information between the electronic devices is regarded as important. Conventional communication between a vehicle control system and a sensor has mainly been performed through point-to-point wiring, causing a lot of problems in terms of production cost, production time, reliability, and the like.

To solve the above-mentioned problems which occur in a conventional communication network in a vehicle, controller area network (CAN) communication has recently been mainly used so that microcomputers or devices communicate with each other without a host computer in the vehicle.

CAN communication corresponds to a scheme of connecting various ECUs installed in a vehicle in parallel and performing processing according to a predetermined order of priority, and is characterized in that various devices may be controlled by only two lines.

In addition, CAN communication is a message-based protocol, highly marketable, and relatively inexpensive. Therefore, a lot of manufacturers have competitively manufactured CAN communication chips. Recently, CAN communication has been occasionally used for industrial automation equipment or medical equipment in addition to a vehicle.

For example, a CAN has been introduced to a railroad application such as a tram, a subway, a light rail, a long-distance train, or the like. The CAN may be easily found in other levels of several networks in the vehicle. In addition, the CAN has been introduced to an aircraft application such as an aircraft state sensor, a navigation system, a research PC in a flight deck, or the like. Moreover, a CAN bus is used for various aerospace applications ranging from in-flight data analysis to an engine control system such as a fuel system, a pump, a linear actuator, or the like.

A medical device manufacturer uses the CAN as an embedded network of a medical device. In practice, some hospitals may manage the entire operating room using the CAN. That is, it is possible to control all equipment disposed in the operating room such as lighting, a table, an X-ray machine, a patient bed, and the like in an integrated manner through a CAN-based system. A lift and an elevator use an embedded CAN, and a hospital uses a CANopen protocol to connect and control devices such as a panel, a controller, a door safety device, and the like. In addition, the CANopen protocol has been used for nonindustrial applications such as laboratory equipment, a sports camera, a telescope, an automatic door, a coffee maker, and the like.

In particular, CAN communication may operate at a transmission rate of up to 1 Mbps, and be suitable for communication over a relatively long distance. Moreover, CAN communication is provided with a receiving filter capable of selectively receiving a particular message identifier configured as hardware.

Conventional CAN communication has a disadvantage in that when a communication line of at least one controller among controllers applied in a vehicle is short-circuited or a circuit in a microcomputer is damaged, communication disruption occurs on the entire CAN communication system and thus communication of all controllers in the system may not be performed.

Even though in-vehicle communication disruption is a simple problem resulting from a short-circuited communication line and the like while causing a fatal defect such as impossible driving, there has been a problem of requiring a lot of time and effort to identify a cause of the disruption in terms of maintenance.

SUMMARY OF THE INVENTION

Accordingly, the present invention is directed to a method of repairing communication disruption using a gateway, and an apparatus and system therefor that substantially obviate one or more problems due to limitations and disadvantages of the related art.

An object of the present invention is to provide a gateway capable of automatically repairing in-vehicle communication disruption by controlling a smart joint block when the communication disruption is detected.

Another object of the present invention is to provide a smart joint block capable of disconnecting a communication line of controller(s) connected to the smart joint block by being linked to a gateway.

A further object of the present invention is to provide a method of repairing communication disruption using a gateway capable of automatically identifying a location of communication disruption on a system under control of a smart joint block and generating and recording a failure code when in-vehicle communication disruption is detected in the gateway, and apparatuses therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The present invention provides a method of repairing communication disruption using a gateway, and an apparatus (or apparatuses) and a system therefor.

To achieve these objects and other advantages and in accordance with the purpose of the invention, as embodied and broadly described herein, a method of repairing communication disruption in a gateway includes detecting whether failure in a communication line occurs by monitoring a change in voltage of the communication line, successively transmitting communication line disconnection request signals to first to Nth smart joint blocks when the occurrence of the communication line failure is detected, and determining whether the communication line failure is repaired after transmitting the communication line disconnection request signals. The communication line failure is repaired by identifying a smart joint block causing the failure according to a result of the determination.

In another aspect of the present invention, a method of repairing communication disruption in a smart joint block connected to a gateway includes receiving a communication line disconnection request signal from the gateway, successively disconnecting communication lines of first to nth controllers, and transmitting a predetermined control signal including information about a location at which the disruption occurs to the gateway when a repair notification signal informing that the disruption is repaired is received from the gateway.

In another aspect of the present invention, a computer-readable recording medium recording a program for execution of one of the above-described methods of repairing communication disruption may be provided.

In another aspect of the present invention, an apparatus for repairing communication disruption includes means for detecting whether failure in a communication line occurs by monitoring a change in voltage of the communication line, means for successively transmitting communication line disconnection request signals to first to Nth smart joint blocks when the occurrence of the communication line failure is detected, means for determining whether the communication line failure is repaired after transmitting the communication line disconnection request signals, and means for repairing the communication line failure by identifying a smart joint block causing the failure according to a result of the determination.

In another aspect of the present invention, a smart joint block linked to a gateway and providing communication lines connected to first to nth controllers includes a first port connected to a communication recovery control line, a microcomputer for generating a predetermined control signal for successively disconnecting the communication lines connected to the first to nth controllers when a communication line disconnection request signal is received from the gateway through the first port, and an application specific integrated circuit (ASIC) including a plurality of transistors for disconnecting the communication lines connected to the first to nth controllers according to the generated control signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. The suffixes "module" and "unit" of elements herein are used for convenience of description and thus can be used interchangeably and do not have any distinguishable meanings or functions.

A mobile phone, a smartphone, a laptop computer, a digital broadcasting terminal, a personal digital assistant (PDA), a portable multimedia player (PMP), a navigation device, or the like may be used as a mobile device described in this specification. However, it should be noted that a configuration according to an embodiment described in this specification is applicable to a fixed terminal such as a desktop computer or the like except for a case in which the configuration is applicable only to a mobile terminal. In particular, the mobile device according to the present invention may have an operator determined barring (ODB) function, and be provided with means for communicating with a gateway through a wire or wirelessly.

Figure 1:
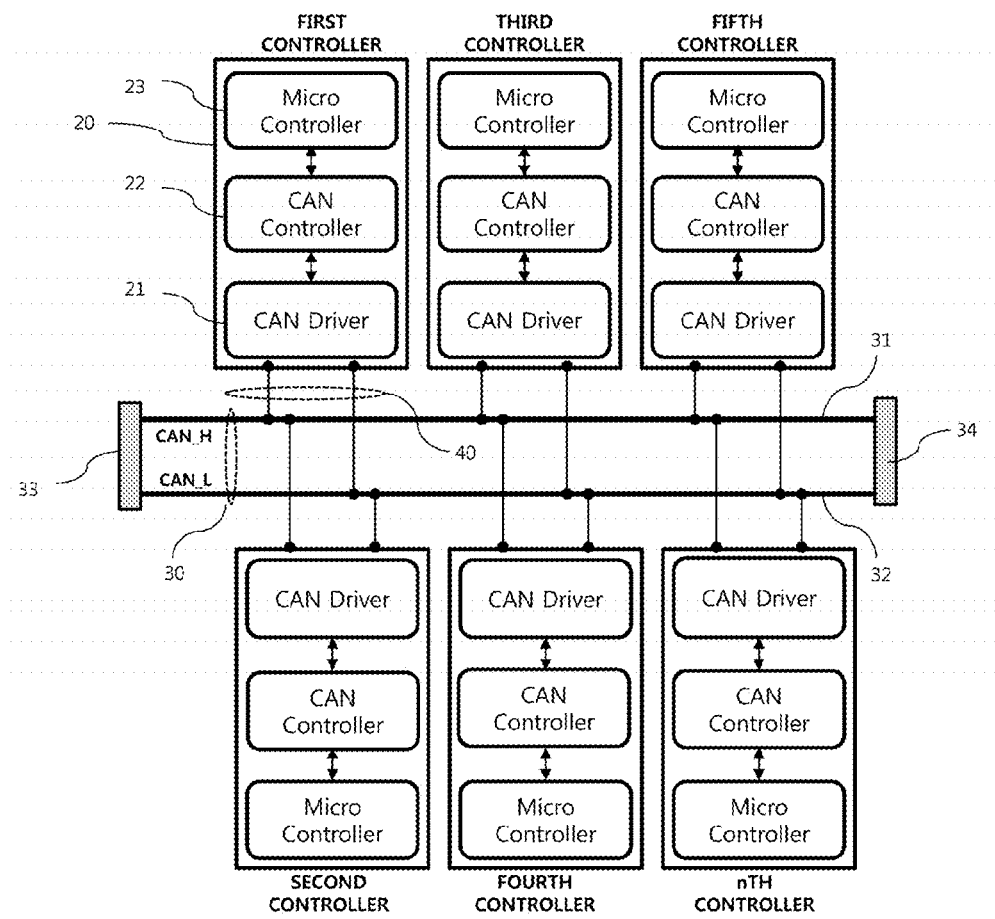
FIG. 1 is a block diagram of a controller area network (CAN) according to a related art.

FIG. 1 illustrates a controller area network (CAN) according to a related art.

Referring to FIG. 1, a conventional high-speed CAN communication network may include first to nth controllers 20, a CAN main bus 30, and CAN stub buses 40 that connect the controllers 20 to the CAN main bus 30.

Here, each of the CAN main bus 30 and the CAN stub buses 40 includes a CAN_H line 31 and a CAN_L line 32. In addition, terminating resistors 33 and 34 may be provided at edges of the CAN main bus 30.

For example, a vehicle may be provided with a transmission control unit (TCU), a four-wheel drive (4WD), liquefied petroleum injection (LPI), an electronic stability program (ESP), a steering angle sensor (SAS), a cluster (gateway), an adaptive front lighting system (AFLS), a tire pressure monitoring system (TPMS), an airbag control unit (ACU), and electro-magnetic susceptibility (EMS) and the like, for which at least one controller may be connected to the high-speed CAN communication network.

Each of the controllers 20 may include a CAN driver included in a physical layer for high-speed CAN communication, a CAN controller 22 which controls the CAN driver 21 and delivers a message received from a micro controller 23 to the CAN driver 21 or a message received from the CAN driver 21 to the micro controller 23 by processing the message, and the micro controller 23 which controls an overall operation of the each of the controllers 20. As another example, each of the controllers 20 may include the micro controller 23 and the CAN driver 21 as one module.

The high-speed CAN communication network includes a controller that operates as a master and a controller that operates as a slave, and one high-speed CAN communication network may include a plurality of master nodes. That is, the high-speed CAN communication network may be configured in a multi-master/slave structure.

In general, a plurality of controllers may not simultaneously send messages in a high-speed CAN communication system. While a controller sends a message, another controller (other controllers) operates in a reception mode. When the controller finishes sending the message, and a CAN bus is changed to an idle state, controllers may competitively occupy the CAN bus to attempt to send messages.

In any system in the high-speed CAN communication network, when a problem such as damage of a circuit on the inside of a controller, a failure in a communication line on the outside of the controller, or the like occurs, a voltage level of the entire CAN bus line is maintained at a particular level. Therefore, there is a problem in that the entire system connected to the high-speed CAN communication network is disabled.

Figure 2:
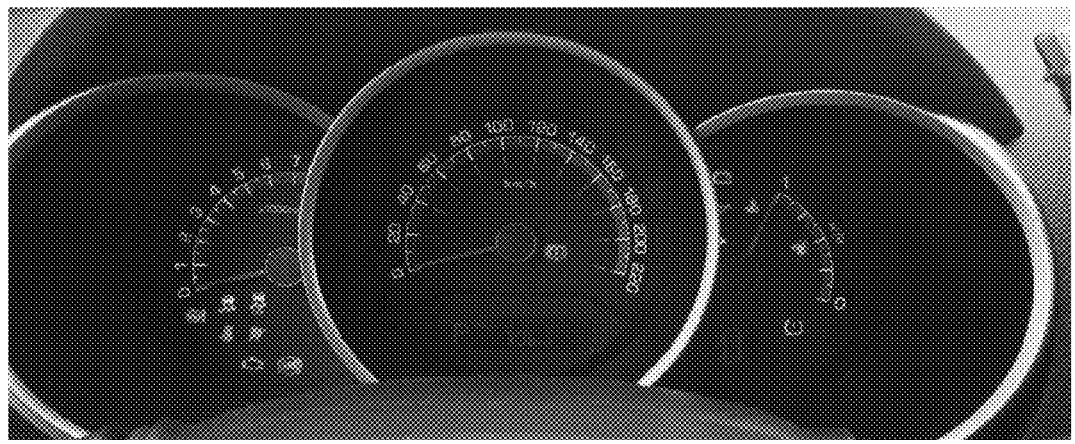
FIG. 2 is a view illustrating various failure codes and warning lights displayed on a cluster display window during in-vehicle communication disruption according to a related art.

When the above-described problem occurs, it is impossible to identify a system or controller that causes the problem. Thus, the entire system in the CAN communication network may be switched to a failure mode. As a result, as illustrated in FIG. 2, various failure codes are displayed on a cluster display window and/or warning lights are turned on.

In the conventional high-speed CAN communication network, when hardware failure such as damage of the micro controller 23 due to overvoltage or communication line failure occurs in one controller, a signal voltage level on the CAN main bus 30, for example, a signal voltage level on the CAN_H line 31 and/or a signal voltage level on the CAN_L line 32 may be fixed to a constant value and maintained. When the signal voltage level on the CAN main bus 30 is maintained at the constant value, the bus is occupied in an abnormal manner, and the entire CAN communication network is maintained in a communication disabled state.

Figure 3:
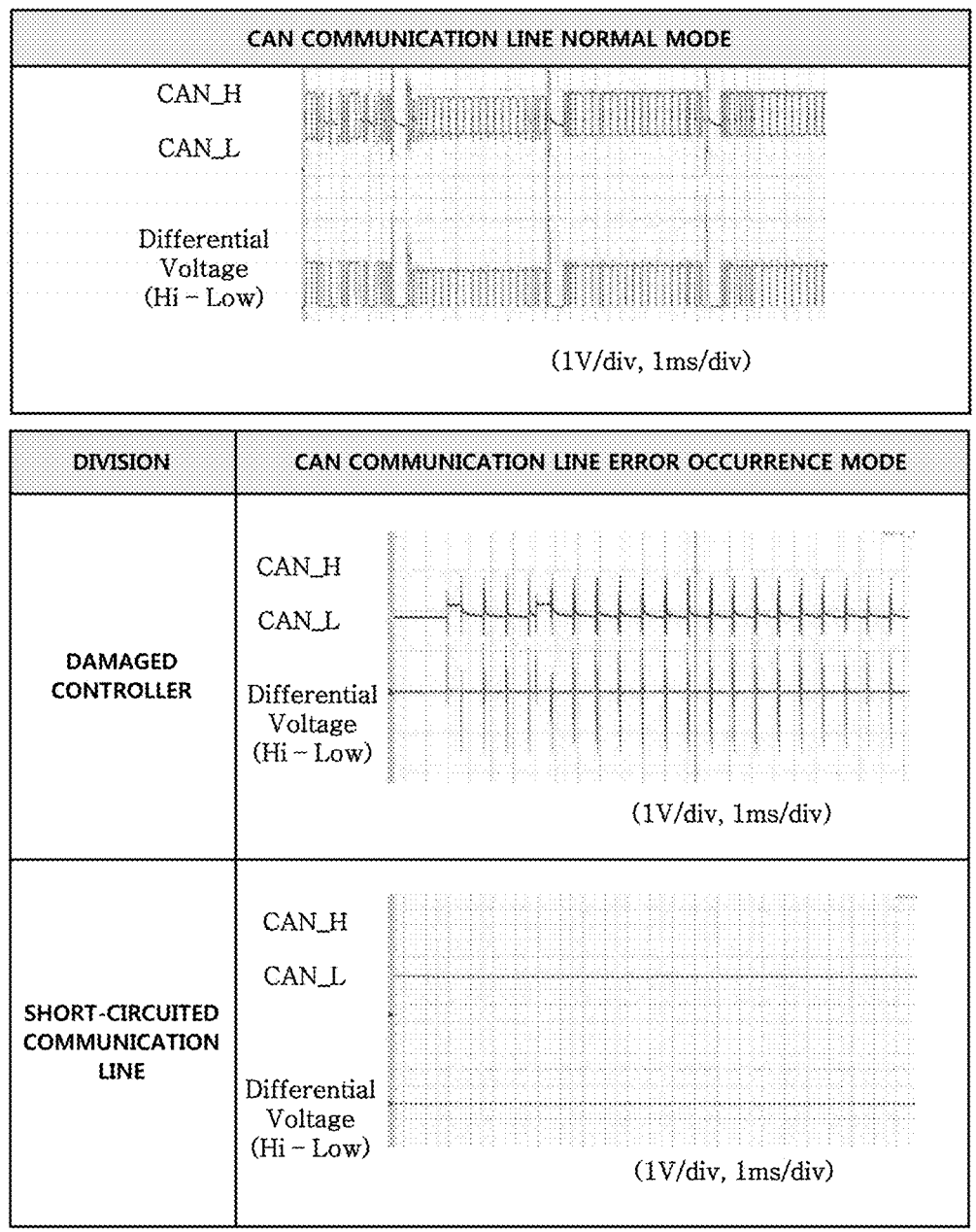
FIG. 3 is a view illustrating a change in voltage on a communication line during failure of a conventional high-speed CAN communication network.

FIG. 3 illustrates a change in voltage on a communication line during a failure of the conventional high-speed CAN communication network.

As illustrated in FIG. 3, when an internal circuit of a controller connected to the high-speed CAN communication network is damaged or a CAN communication line, such as the CAN_H line 31 or the CAN_L line 32, or a power line is short-circuited, a voltage of the CAN communication line is maintained at a particular voltage level. In this case, errors may occur in all CAN frames transmitted and received in the high-speed CAN communication network, and a state of the CAN bus may be converted from a normal state (ON state) into an error state (OFF state). Hence, a system operation in the high-speed CAN communication network may be suspended and thus it may be impossible to start or drive a vehicle.

Figure 4:
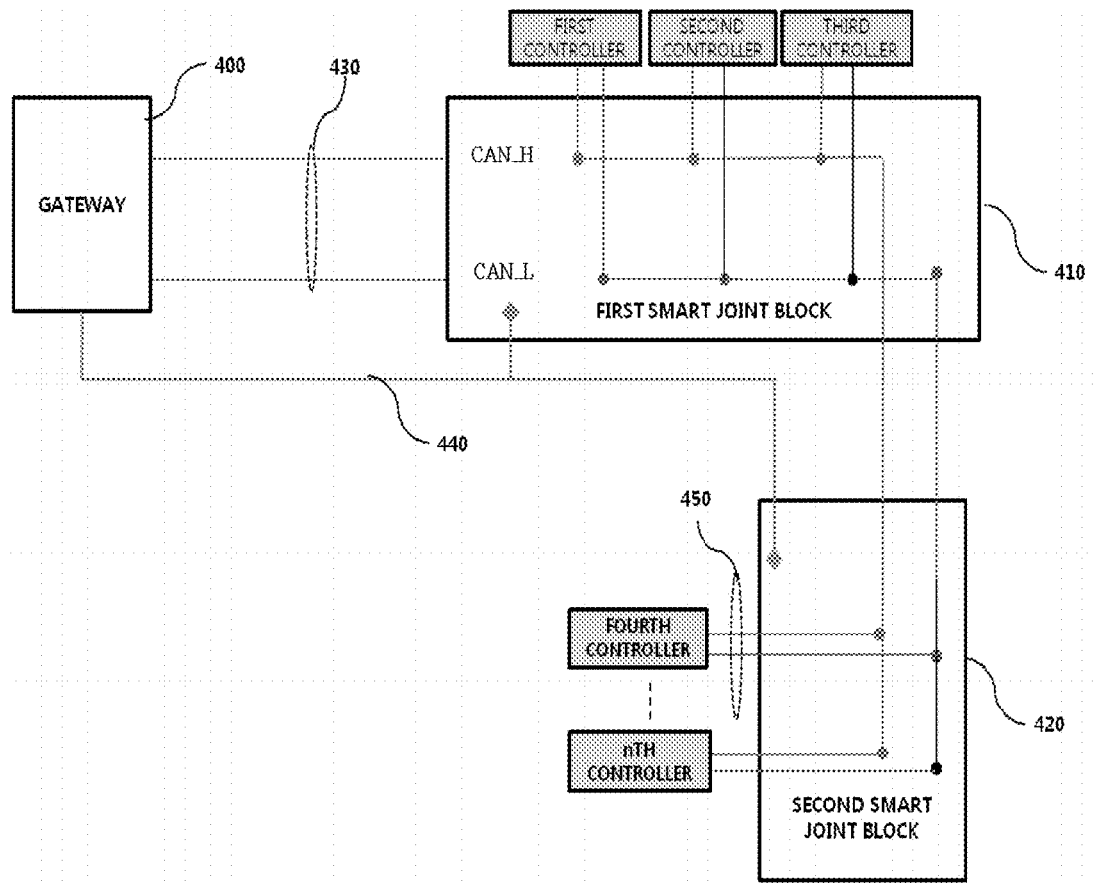
FIG. 4 is a block diagram illustrating a communication disruption repair system according to an embodiment of the present invention.

FIG. 4 illustrates a communication disruption repair system according to an embodiment of the present invention.

Referring to FIG. 4, the communication disruption repair system may include a gateway 400 that manages a message delivery between network topologies or controllers, and first to nth smart joint blocks, each of which minimizes signal distortion by being connected to a neighbor node through a CAN main bus 430 and connected to controller(s) through CAN stub buses 450. Here, it should be noted that the number of the smart joint blocks included in the communication disruption repair system and the number of the controllers connected to each of the smart joint blocks may vary according to a configuration of an in-vehicle communication network and a car model.

Hereinafter, a case in which the high-speed CAN communication network includes two smart joint blocks corresponding to a first smart joint block 410 and a second smart joint block 420 will be described as an example.

As illustrated in FIG. 4, the gateway 400, the first smart joint block 410 and the second smart joint block 420 may be connected to one another through a predetermined communication recovery control line 440, and the gateway 400 may transmit, to a smart joint block, a predetermined communication line disconnection request signal (hereinafter, which is interchangeably used together with a disconnection request signal for convenience of description) for disconnecting the CAN_H line and/or the CAN_L line of controller(s) connected to the corresponding smart joint block through the communication recovery control line 440.

In particular, each of the gateway 400 and the smart joint blocks 410 and 420 may transmit and receive a predetermined control signal through the separate communication recovery control line 440 unrelated to CAN communication disruption. The gateway 400 may not only identify a location at which CAN communication disruption occurs but also automatically repair CAN communication disruption by successively transmitting CAN communication disconnection requests to the smart joint blocks 410 and 420.

In addition, the gateway 400 may store information about the identified location at which the disruption occurs and a history of the disruption repair in an internal memory or transmit the information and the history to an external device such as a vehicle head unit, an external diagnosis device, or the like.

Here, the disruption location may include identification information of a smart joint block in which the communication disruption occurs and identification information of a controller directly causing the corresponding communication disruption. The disruption repair history may include information about a point in time at which the communication disruption is detected, information about whether the communication disruption is successfully repaired, information about a point in time at which the communication disruption is repaired, and the like.

In particular, the gateway 400 may verify whether disruption in the CAN communication network is repaired by monitoring voltage levels of the CAN_H line and the CAN_L line of the CAN main bus 430 after transmitting the disconnection request signal to the smart joint block.

On the other hand, upon receiving the disconnection request signal from the gateway 400, each of the first and second smart joint blocks 410 and 420 successively disconnects a CAN_H line and a CAN_L line of controller(s) connected thereto. In this instance, upon receiving a predetermined repair notification signal informing that the CAN communication disruption is successfully repaired from the gateway 400, a smart joint block may transmit disruption occurrence location information including information for identification of the smart joint block, information for identification of a controller corresponding to a communication channel which is currently in a disconnected state, for example, a CAN stub line, information for identification of a communication line (or communication channel) in the corresponding smart joint block to the gateway 400 through a predetermined control signal. Here, the communication line (or communication channel) identification information may be unique identification information for uniquely identifying the CAN stub line in the corresponding smart joint block.

Figure 5:
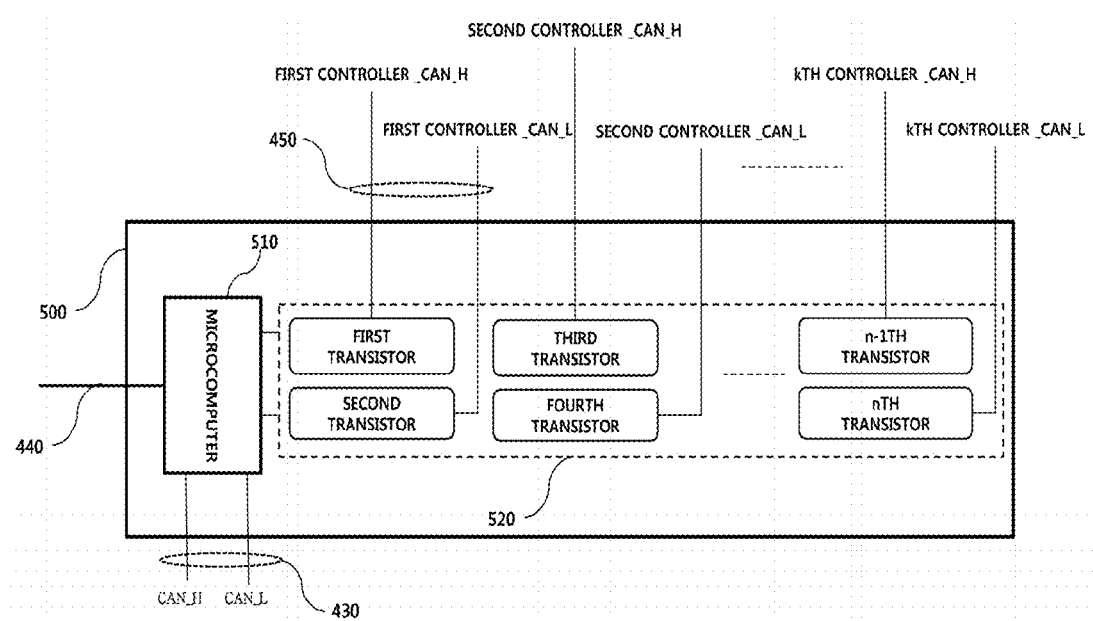
FIG. 5 is a block diagram illustrating an internal configuration of a smart joint block according to an embodiment of the present invention.

FIG. 5 illustrates an internal configuration of a smart joint block 500 according to an embodiment of the present invention.

Referring to FIG. 5, the smart joint block 500 may include one microcomputer 510 that performs a control operation to successively disconnect CAN communication lines of first to kth controller(s) connected to the smart joint block 500, and an application specific integrated circuit (ASIC) 520 having first to nth transistors. Here, one of a metal oxide silicon field effect transistor (MOSFET), a thin film transistor (TFT), and the like may be used as each of the transistors.

The microcomputer 510 may successively disconnect CAN communication lines of first to nth controllers by controlling the ASIC 520 according to the disconnection request signal received from the gateway 400 through the communication recovery control line 440. To this end, the smart joint block 500 may be provided with a first separate port connected to the communication recovery control line 440. It should be noted that the first port is a separate port different from a communication port for CAN communication. In general, when an error occurs on a CAN communication line, CAN communication may not be performed between all devices (or controllers) in an associated gateway system. Therefore, the present invention is characterized in that when an error occurs in the CAN communication line, the gateway 400 and the smart joint block 500 may transmit and receive a control signal through the separate communication recovery control line 440.

In addition, the microcomputer 510 may identify a location at which CAN communication disruption occurs according to the repair notification signal received from the gateway 400 through the communication recovery control line 440, and transmit disruption occurrence location information corresponding to the identified disruption location to the gateway 400 through the communication recovery control line 440. As another example, the microcomputer 510 may verify whether disruption of the CAN communication network is repaired according to disconnection of the CAN stub buses 450 by directly monitoring voltage levels of the CAN_H line and the CAN_L line of the CAN main bus 430 in real time. Thereafter, according to a result of verification, the microcomputer 510 may transmit the disruption occurrence location information to the gateway 400 through the repaired CAN main bus 430.

Moreover, after transmitting the disruption occurrence location information to the gateway 400, the microcomputer 510 may maintain one of the CAN stub buses 450 of the controller that causes the disruption in a disconnected state so that the controller may not access the high-speed CAN communication network.

In addition, when disruption is not repaired after successively disconnecting the CAN stub buses 450 of the controllers, the microcomputer 510 may presume that at least one of the CAN stub buses 450 has an error and simultaneously disconnect all the CAN stub buses 450 connected to the corresponding smart joint block. Thereafter, upon detecting disruption repair, the microcomputer 510 may transmit, to the gateway 400, a predetermined control signal informing that all the CAN stub buses 450 of the corresponding smart joint block are disconnected. Subsequently, the gateway 400 may record a predetermined failure code that indicates failure in the corresponding smart joint block in an internal memory according to the received control signal.

Figure 6:
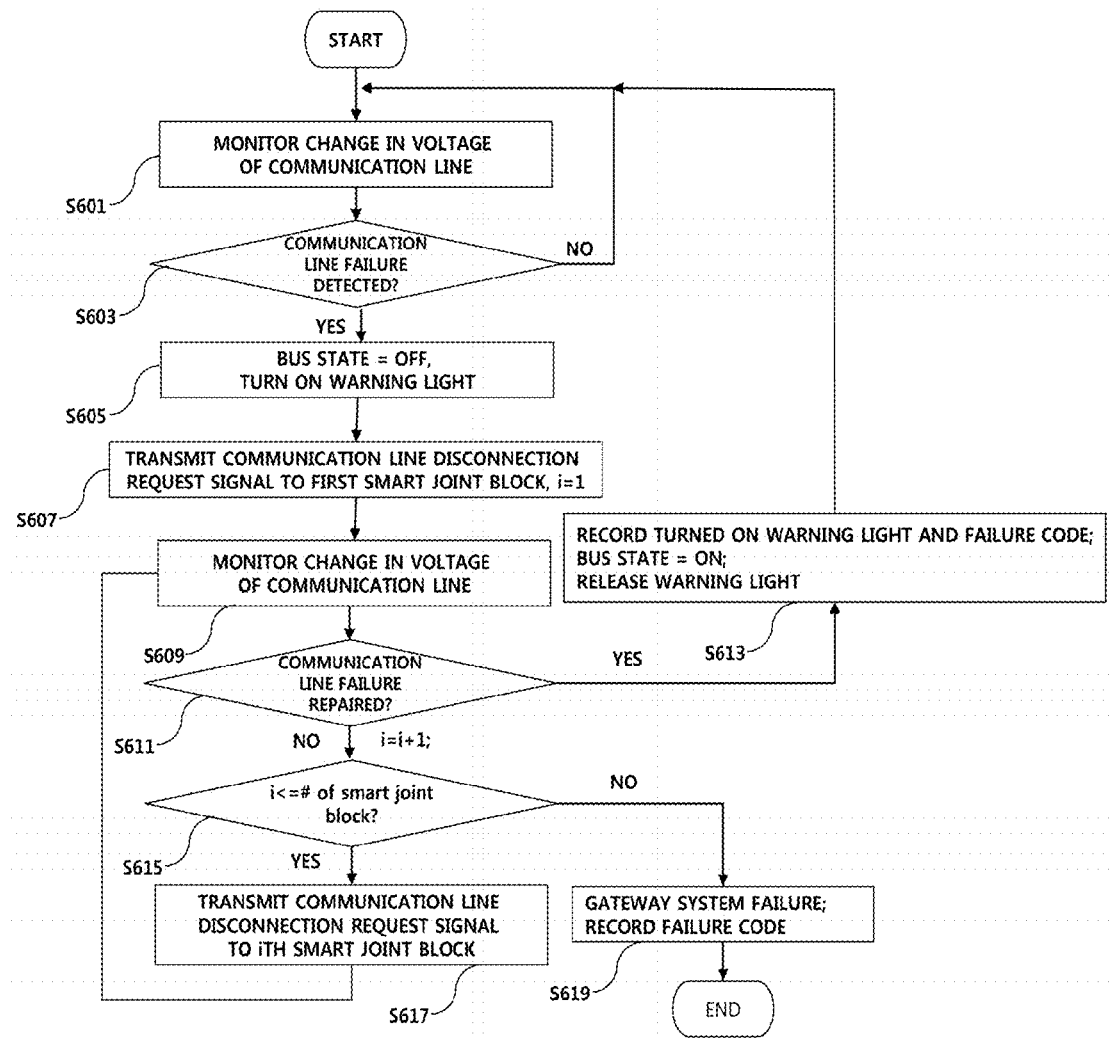
FIG. 6 is a flowchart illustrating a method of automatically repairing communication disruption using a gateway according to an embodiment of the present invention.

FIG. 6 illustrates a method of automatically repairing communication disruption using the gateway 400 according to an embodiment of the present invention.

Specifically, FIG. 6 is a flowchart illustrating a method of automatically repairing communication line failure by being linked to the smart joint block 500 in the gateway 400.

Referring to FIG. 6, the gateway 400 monitors a change in voltage of a communication line in S601. In this instance, when communication line failure is detected as a result of monitoring, the gateway 400 may convert a bus state into the OFF state, that is, an abnormal state, and send a control signal so that a predetermined warning light indicating the communication line failure is turned ON in a cluster display window in S603 to S605.

As an example, in high-speed CAN communication, the gateway 400 may measure voltage levels of the CAN_H line and the CAN_L line of the CAN main bus 430, and determine that the communication line failure occurs when a difference between the two measured voltage levels is maintained at a particular value for a predetermined period of time. As another example, it is possible to determine whether the communication line failure occurs by comparing a change in voltage level of the CAN_H line and a change in voltage level of the CAN_L line with a first reference value and a second reference value, respectively.

Subsequently, the gateway 400 may transmit a communication line disconnection request signal to the first smart joint block 410 through the communication recovery control line 440 in S607. In this instance, a value of a variable i that indicates the number of communication line disconnection request signals transmitted up to the present is set to 1.

Thereafter, the gateway 400 monitors a change in voltage of the communication line to verify whether the communication line failure is repaired in S609 to S611.

When the communication line failure is repaired as a result of verification in S611, the gateway 400 may record information about the warning light which is turned ON according to the occurrence of disruption and failure code in the internal memory, and then convert the bus state to the ON state, that is, the normal state, and release the warning light which is turned ON and the like in S613. Thereafter, the gateway 400 performs the above-described operation of S601. Although not illustrated in FIG. 6, when the communication line failure is repaired, the gateway 400 may receive the disruption occurrence location information from the smart joint block 500, and record the information in the internal memory. Thereafter, a user may check information about the warning light which has been turned ON, the failure code, the disruption occurrence location information, and the like by accessing the gateway 400 through the external device, which may include an on-board diagnostics (OBD) device, a user mobile terminal, a vehicle head unit, or the like, and take an appropriate measure.

When the communication line failure is not repaired as a result of verification in S611, the gateway 400 may increase the value i by 1, and determine whether the value i is smaller than or equal to the number of smart joint blocks included in the associated gateway system in S615.

When the value i is smaller than or equal to the number of smart joint blocks, the gateway 400 transmits the communication line disconnection request signal to an ith smart joint block, and returns to S609 to monitor a change in voltage of the communication line in S617.

When the value i is greater than the number of smart joint blocks as a result of determination in S615, the gateway 400 may determine failure in the entire gateway system, and record a predetermined failure code according to the failure in S619.

Advantages and effects of the present invention are described below.

First, the present invention has an advantage of providing a method of automatically repairing communication disruption using a gateway, and an apparatus and system therefor.

Second, the present invention has an advantage of providing a gateway capable of automatically repairing in-vehicle communication disruption by controlling a smart joint block when the communication disruption is detected.

Third, the present invention has an advantage of rapidly identifying a fault location with a smart joint block and/or a controller as a unit by a gateway that disconnects a communication line of the controller(s) connected to the smart joint block when communication disruption is detected in a vehicle.

Fourth, the present invention has an advantage of facilitating repair of in-vehicle communication disruption on a system by automatically identifying a location of the disruption under control of a smart joint block and generating and recording failure code when the disruption is detected in the gateway.

Fifth, the present invention may provide a safer and more reliable vehicle communication system through the above-described advantages.

Advantages and effects that may be obtained from the present invention are not limited to the above-mentioned advantages and effects, and other advantages and effects not mentioned may be clearly understood by those skilled in the art from the above description.

Those skilled in the art will appreciate that the present invention may be carried out in other specific ways than those set forth herein without departing from the spirit and essential characteristics of the present invention.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of repairing communication disruption in a gateway, comprising:
    determining whether failure in a communication line occurs by monitoring a change in voltage of the communication line;
    successively transmitting communication line disconnection request signals to a plurality of smart joint blocks when the occurrence of the communication line failure is detected; and
    determining whether the communication line failure is repaired after transmitting the communication line disconnection request signals,
    wherein the communication line failure is repaired by identifying a smart joint block causing the failure according to a result of the determination.

2. The method according to claim 1, wherein the communication line failure is determined to occur when a voltage level of the communication line is maintained at a constant value for a predetermined period of time as a result of the monitoring.

3. The method according to claim 1, wherein the communication line is a high-speed controller area network (CAN) communication line.

4. The method according to claim 3, wherein the high-speed CAN communication line includes a CAN_H line and a CAN_L line,
    wherein the communication line failure is determined to occur when a difference in voltage level between the CAN_H line and the CAN_L line is constant for a predetermined period of time.

5. The method according to claim 3, wherein the high-speed CAN communication line includes a CAN_H line and a CAN_L line,
    wherein whether the communication line failure occurs is determined by comparing a change in voltage level of the CAN_H line for a predetermined period of time with a first reference value.

6. The method according to claim 3, wherein the high-speed CAN communication line includes a CAN_H line and a CAN_L line,
    wherein whether the communication line failure occurs is determined by comparing a change in voltage level of the CAN_L line for a predetermined period of time with a second reference value.

7. The method according to claim 1, wherein the plurality of smart joint blocks are connected through a communication recovery control line different from the communication line,
    wherein the communication line disconnection request signals are transmitted through the communication recovery control line.

8. The method according to claim 1, further comprising:
    transmitting a predetermined repair notification signal to a smart joint block to which a most recently one of the communication line disconnection request signals is transmitted, when the failure is determined to be repaired; and
    receiving a control signal including information about a location at which the failure occurs from the smart joint block receiving the repair notification signal.

9. The method according to claim 8, wherein the failure occurrence location information includes at least one of information for identification of the smart joint block, information for identification of a controller connected to the smart joint block, and information for identification of a communication channel in the smart joint block.

10. The method according to claim 8, wherein at least one of information about a warning light turned ON in connection with the failure, information about a failure code, the failure occurrence location information, and information about a history of occurrence of the failure is stored when the detected failure is determined to be repaired.

11. A method of repairing communication disruption in a smart joint block connected to a gateway, comprising:
    receiving a communication line disconnection request signal from the gateway;
    successively disconnecting communication lines of plurality of controllers; and
    transmitting a predetermined control signal including information about a location at which the disruption occurs to the gateway when a repair notification signal informing that the disruption is repaired is received from the gateway.

12. The method according to claim 11, further comprising simultaneously disconnecting all the communication lines connected to the plurality of controllers when the repair notification signal is not received until finishing successively disconnecting the communication lines.

13. The method according to claim 11, wherein the disruption occurrence location information includes at least one of information for identification of the smart joint block, information for identification of a controller connected to the smart joint block, and information for identification of a communication channel in the smart joint block.

14. The method according to claim 11, wherein the communication line disconnection request signal is received through a communication recovery control line different from the communication lines.

15. The method according to claim 11, wherein the communication lines are CAN communication lines.

16. The method according to claim 11, wherein the communication lines are disconnected using a transistor included in the smart joint block.

17. An system for repairing communication disruption, comprising:
  a plurality of smart joint blocks connected to plural controllers; and
  a gateway connected to the plurality of smart joint blocks,
  wherein the gateway: detects whether failure in a communication line occurs by monitoring a change in voltage of the communication line;
  successively transmits communication line disconnection request signals to the plurality of smart joint blocks when the occurrence of the communication line failure is detected
  determines whether the communication line failure is repaired after transmitting the communication line disconnection request signals; and
  repairs the communication line failure by identifying a smart joint block causing the failure according to a result of the determination.

18. The system according to claim 17, wherein the plurality of smart joint blocks are connected through a communication recovery control line different from the communication line, wherein the communication line disconnection request signals are transmitted through the communication recovery control line.

19. A smart joint block linked to a gateway and providing communication lines connected to a plurality of controllers, comprising:
  a first port connected to a communication recovery control line;
  a microcomputer for generating a predetermined control signal for successively disconnecting the communication lines connected to the plurality of controllers when a communication line disconnection request signal is received from the gateway through the first port; and
  a circuit including a plurality of transistors for disconnecting the communication lines connected to the plurality of controllers according to the generated control signal.

20. The smart joint block according to claim 19, wherein the microcomputer transmits a predetermined control signal including information about a location at which disruption occurs to the gateway when a repair notification signal informing that the disruption is repaired is received from the gateway.

21. The smart joint block according to claim 20, wherein all the communication lines connected to the plurality of controllers are simultaneously disconnected when the repair notification signal is not received until finishing successively disconnecting the communication lines.

22. The smart joint block according to claim 20, wherein the disruption occurrence location information includes at least one of information for identification of the smart joint block, information for identification of a controller connected to the smart joint block, and information for identification of a communication channel in the smart joint block.

* * * * *